United States Patent [19]

Nishiwaki

[11] Patent Number: 5,010,228
[45] Date of Patent: Apr. 23, 1991

[54] TOOL CHANGER FOR WELDING ROBOT

[75] Inventor: Toshihiro Nishiwaki, Kanagawa, Japan

[73] Assignee: Obara Corporation, Tokyo, Japan

[21] Appl. No.: 282,601

[22] Filed: Dec. 9, 1988

[30] Foreign Application Priority Data

Dec. 28, 1987 [JP] Japan .................................. 62-329426
Feb. 16, 1988 [JP] Japan .................................. 63-31823
Oct. 25, 1988 [JP] Japan .................................. 63-26705

[51] Int. Cl.$^5$ .............................................. B23K 11/00
[52] U.S. Cl. ..................................... 219/86.25; 901/42
[58] Field of Search .......................... 219/86.8, 86.25; 901/42

[56] References Cited

U.S. PATENT DOCUMENTS 2,379,226 6/1945 Frey .
4,525,918 7/1985 Puritz .
4,551,903 11/1985 Bisiach ............................... 219/86.8
4,737,611 4/1988 Humblot ........................... 219/86.25

FOREIGN PATENT DOCUMENTS 922558 4/1963 United Kingdom .

Primary Examiner—Clifford C. Shaw
Attorney, Agent, or Firm—Flynn, Thiel, Boutell & Tanis

[57] ABSTRACT

A tool changer for welding robot comprising: male portions of connectors provided at a substrate fixed to a robot arm side for supplying electricity, gas, air, water to the tool side from the robot arm side; and female portions of connectors to be connected to the male portions of the connectors and provided at a substrate fixed to a tool side for receiving electricity, gas, air, water from the male portions of connectors, characterized in that one pair or plural pairs of connectors serve both the connectors and a guide mechanism composed of a guide pin and a guide receiver.

5 Claims, 6 Drawing Sheets

_5,010,228_

TOOL CHANGER FOR WELDING ROBOT

BACKGROUND OF THE INVENTION

1. Field of the Invention

The present invention relates to an improvement of a tool changer for a welding robot which is adapted to supply electricity, gas, air, water and the like to a tool such as a welding robot gun.

2. Description of the Prior Art

A tool changer for welding robot of this type is known as illustrated in FIG. 8. The prior tool changer for welding robot will be described hereunder with reference to FIG. 8. The prior tool changer for welding robot comprises a substrate 111 connected to a welding robot arm (not shown), an absorbing plate 113 supported by the substrate 111 via piano lines 112 at three points thereof for absorbing a lateral displacement of movement thereof, a holding plate 117 supported by the absorbing plate 113 via piano lines 114 at three points thereof for holding a guide pin 115 and a connector 116 (for supplying electricity, gas, air, water), and another substrate 118 provided with female portions 119, 120 respectively for receiving the guide pin 115 and the connector 116.

With the arrangement of the prior tool changer for welding robot the other substrate 118 is moved close to the substrate 111 so that the guide pin 115 is inserted into the female portion 119 whereby the connector 116 can be inserted into the female portion 120.

There is another of this type, so-called gun changer as illustrated in FIG. 9.

The gun changer comprises a substrate 130 provided with connector 132, a substrate 131 provided with connectors 133 in confronting relation with the connectors 132 and a transformer 134 mounted at the side opposite to the connectors 133 and having secondary terminals 135, 135, a movable arm 137 which is movable by a cylinder 136 and connected to one of the secondary terminals, an arm 138 connectoed to other of the secondary terminals, the movable arm 137, the arm 138 and the cylinder 136 being laid over the transformer 134 for welding purpose via an equalizer 139. Hence, when the gun is to be changed, the whole device including the transformer at the side of the welding gun shall be replaced with another device.

However, there are following problems in the prior tool changer for welding robot.

(1) Inasmuch as the guide pin and the guide pin receiver as well as the connector have been employed in the tool changer, the tool changer has a complex construction and the guie pin has no function other than to merely guide the connector.

(2) Various connectors depending on the various purposes of the tools are provided both at the side of the tool or the welding gun and the side of the robot whereby a considerable cost, and a facility in the provision thereof are required as well as laborious and inefficient procedures for replacement thereof.

(3) In the gun changer having the transformer thereon, the gun changer is bulky as a whole, and the center of gravity is high which makes the gun changer unstable. Furthermore, since the transformer is to be changed at the state where the transformer is connected to the gun, the transformer is required to be changed for each welding gun.

It is therefore an object of the present invention to provide a tool changer for welding robot having connectors serving also as the guide pin and the guide pin receiver so that the guide pin and the guide pin receiver can be omitted to simplify the construction thereof whereby first problem set forth above (1) is overcome, hacking connectors unitized and detachably mounted on the second base on each substrate whereby the problem set forth above (2) is overcome, and having connectors disposed at both outsides of the transformer whereby the third problem set forth above (3) is overcome.

To achieve the above objects, the tool changer for welding robot comprises male portions of connectors provided at a substrate fixed to a robot arm side for supplying electricity, gas, air, water to the tool side from the robot arm side; and female portions of connectors to be connected to the male portions of the connectors and provided at a substrate fixed to a tool side for receving electricity, gas, air, water from the male portions of connectors, characterized in that one pair or plural pairs of connectors serve as both the connectors and a guide mechanism composed of a guide pin and a guide receiver.

Another tool changer for welding robot comprises male portions of connectors provided at a substrate fixed to a robot arm side for supplying electricity, gas, air, water to the tool side from the robot arm side; and female portions of connectors to be connected to the male portions of the connectors and provided at a substrate fixed to a tool side for receving electricity, gas, air, water from the male portions of connectors, characterized in that the male and the female portions of connectors are respectively unitized in the plural numbers and detachably mounted on each substrate.

Still another tool changer for welding robot comprises male portions of connectors provided at a substrate fixed to a robot arm side for supplying electricity, gas, air, water to the tool side from the robot arm side; and female portions of connectors to be connected to the male portions of the connectors and provided at a substrate fixed to a tool side for receving electricity, gas, air, water from the male portions of connectors; a transformer provided at the substrate fixed to the welding gun side and disposed between the female portion of connectors, characterized in that one or more pairs of connectors serve as both the connectors and a guide mechanism composed of a guide pin and a guide receiver.

The above and other objects, features and advantages of the present invention will become more apparent from the following description taken in conjunction with the accompanying drawings.

DESCRIPTION OF THE PREFERRED EMBODIMENT

FIRST EMBODIMENT (FIG. 1)

A tool changer for welding robot according to a first embodiment of the present invention will be described with reference to FIG. 1.

According to the tool changer for welding robot, a transformer is disposed centrally of the connectors, and secondary terminals of the transformer and terminals of the welding gun side are connected to each other when the connectors thereof are connected to each other.

In the figure, designated at 1 is a substrate or base plate fixed to a terminal of robot arm 2, 3 is a substrate fixed to a tool side, for example, a welding gun side (not shown).

Figure 1:
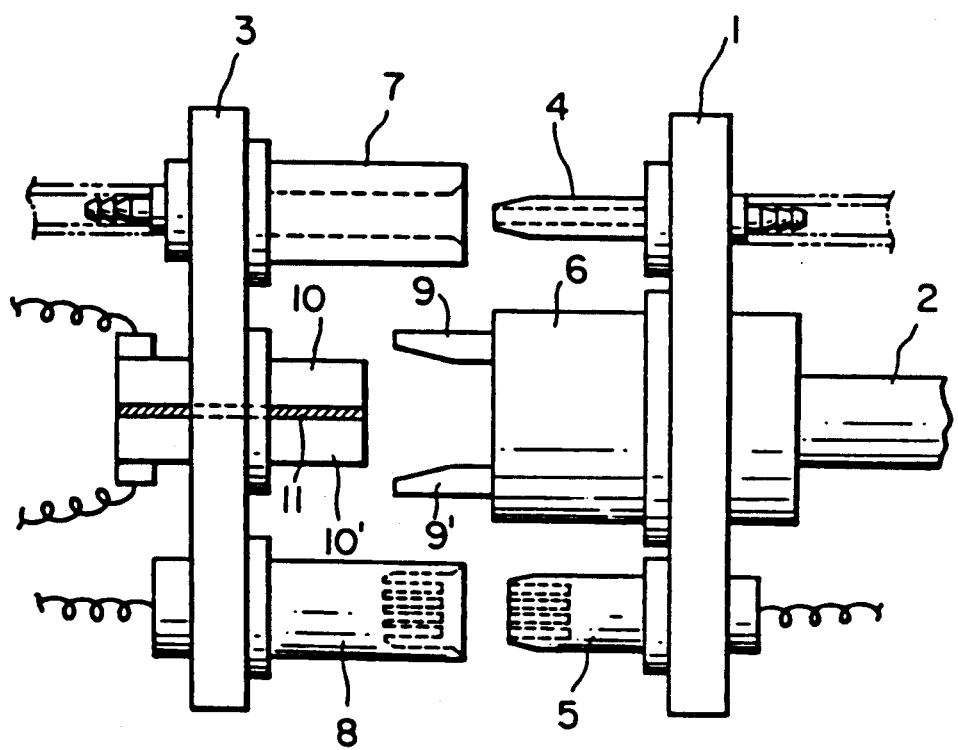
FIG. 1 is a side elevational view of a tool changer for welding robot according to a first embodiment of the present invention.

The substrate 1 has male portions comprising a connector 4 (having therein a cold water passage connected to a supply hose shown in broken lines in FIG. 1) serving also as a guide pin for positioning the substrates 1, 3 and projected connectors 5, 5 ... for supplying electricity, gas, air, and the like. These connectors are arranged at both outsides of a transformer 6 fixed to the substrate 1.

The substrate or base plate 3 has female portions comprising a connector 7 (having therein a cold water passage connected to a supply hose shown in broken lines in FIG. 1) serving also as a guide pin for positioning the substrates 1, 3 and projected connectors 8, 8 ... for receiving electricity, gas, air, and the like. Welding gun terminals 10, 10' to be connected to secondary terminals 9, 9' of the transformer 6 are fixed to the substrate 3 and have disposed therebetween an insulated plate 11. Accordingly, after the substrates 1, 3 are respectively fixed to the robot arm side and the welding gun side, the substrates 1, 3 are brought close to each other so that the connector 4 also serving as the guide pin provided at the substrate 1 is inserted into the connector 7 serving also as the guide pin receiver provided at the substrate 3 whereby the cold water passage is defined while the other connectors 5, 5 ... 8, 8 ... are respectively connected to each other for defining passages for supplying electricity, gas, air, and the like. Simultaneously with the connections of these connectors the secondary terminals 9, 9' of the transformer 6 are respectively connected to the terminals 10, 10' of the welding gun side.

According to the first embodiment, the connector 4 serves as both the connector and the guide pin and may be used as a channel for supplying water or electricity for supplying gas or air and the like depending on the usage of the tool.

SECOND EMBODIMENT (FIG. 2 TO FIG. 5)

A tool changer for welding robot according to a second embodiment of the present invention will be described with FIGS. 2 to 7.

According to the second embodiment, connectors are unitized and are detachably mounted on each substrate. In the figures, designated at 31 is a substrate fixed to an end of a robot arm side and 32 is a substrate fixed to a side of a tool, for example, a welding gun. The substrate 31 has thereon a cylindrical coupler 34 defining a concave opening 33 at the central portion thereof and carrying thereon a yoke which includes fixing elements 35 through 38 fixed radially at the circumference of the coupler 34. Guide pins 39 and 40 are fixed to fixing elements 35, 36. The substrate 32 has thereon a female coupler 42 provided with a projection 41 to be engaged in the concave 33 and carrying thereon a yoke which includes fixing elements 43 through 46 fixed radially at the circumference of the female coupler 42. Guide pin receivers 47, 48 for receiving the guide pins 39, 40 are fixed to the fixed elements 43, 44.

Figure 2:
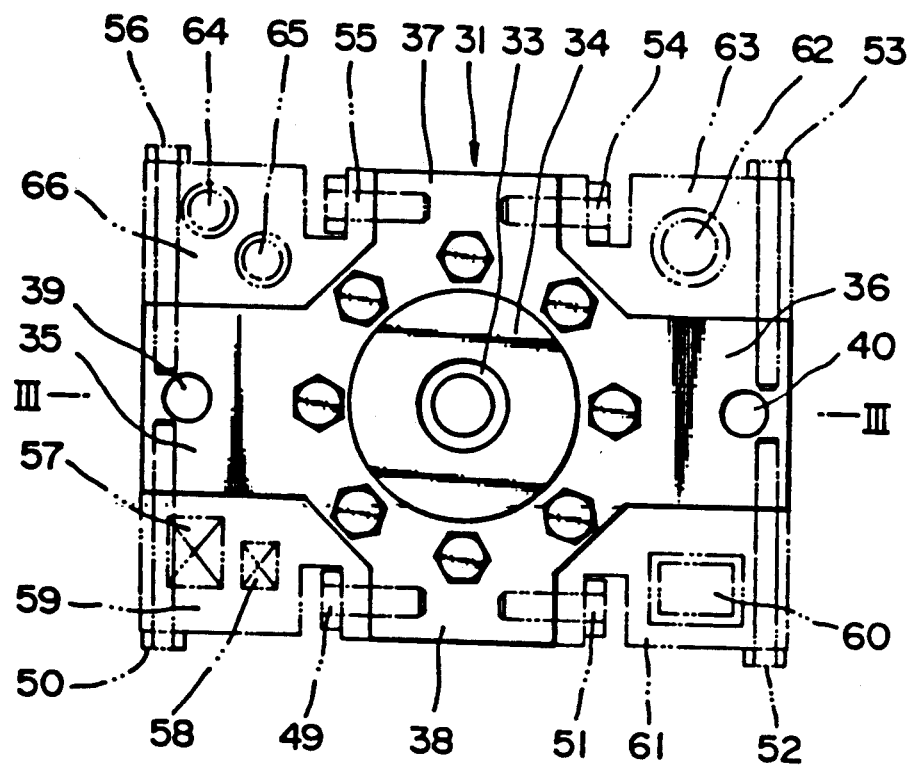
FIG. 2 is a front elevational view of a substrate, disposed at the robot arm side, of a tool changer for welding robot according to a second embodiment of the present invention.
Figure 3:
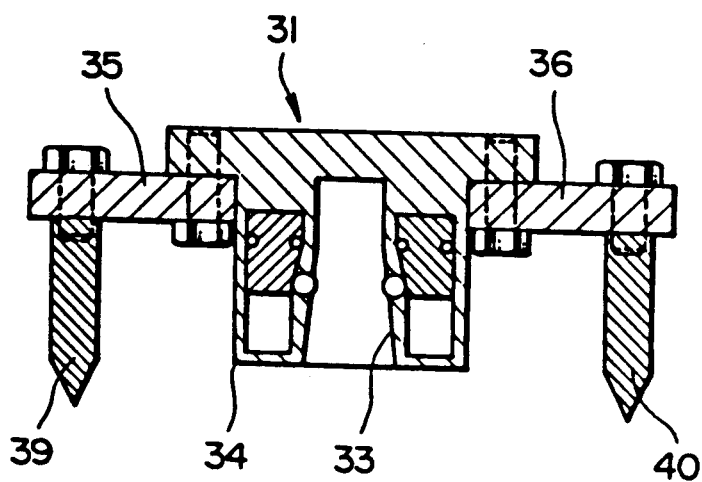
FIG. 3 is a cross sectional view taken along III—III of FIG. 4.

As illustrated in an imaginary line of FIG. 2, provided detachably between the fixed elements 35, 38; 38, 36; 36, 37; and 37, 35 of the substrate 31 are a plurality of unitized male connectors which are respectively fixed to the fixed elements, for example, by bolts 49, 50; 51, 52; 53, 54; and 55, 56. A plurality of male connectors, namely, the units comprise connectors 57, 58 (having inside thereof pins for supplying a low voltage current) of a unit 59, a connector 60 (having inside thereof a pin for supplying a high voltage current) of a unit 61, a connector 62 (having inside thereof a tube for supplying gas) of a unit 63, and connectors 64, 65 (having inside thereof cold water passages) of a unit 66.

Figure 4:
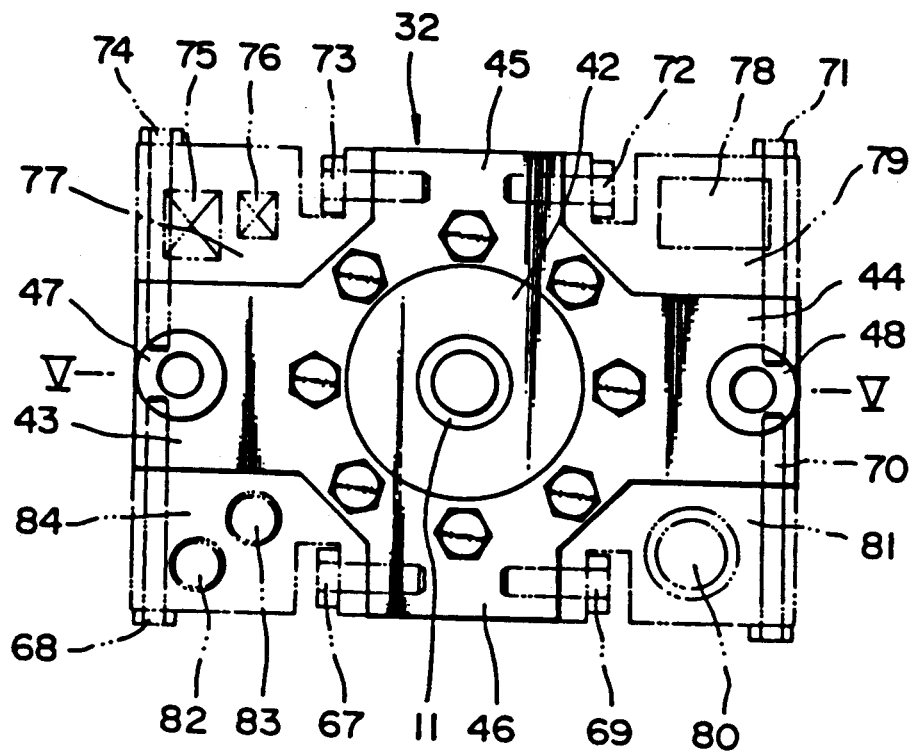
FIG. 4 is a front elevational view of a substrate, disposed at the tool side, of a tool changer for welding robot according to a second embodiment of the present invention.
Figure 5:
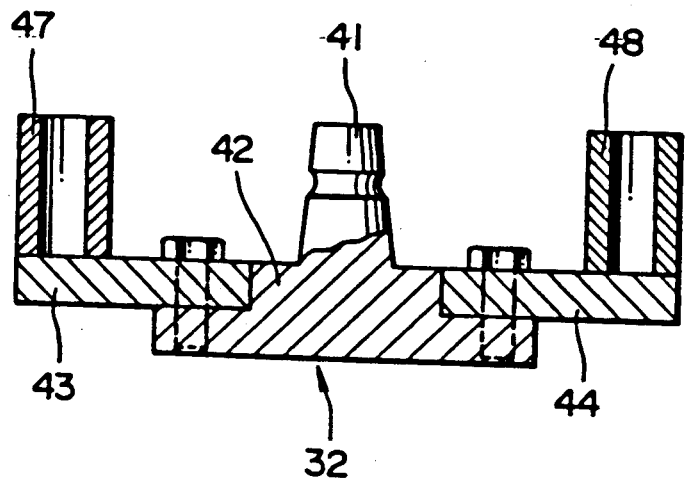
FIG. 5 is a cross sectional view taken along V—V of FIG. 4.

As illustrated in an imaginary line of FIG. 4, provided detachably between the fixed elements 43, 46; 46, 44; 44, 45; and 45, 43 of the substrate 32 are a plurality of unitized connectors which are respectively fixed to the fixed elements, for example, by bolts 67, 68; 69, 70; 71, 72; and 73, 74.

A plurality of female connectors, namely, the units comprise, for example, a connector 75, a connector 76 (having therein a pin for receiving a low voltage current) of a unit 77, a connector 78 (having therein a pin for receiving a high voltage current) of a unit 79, a connector 80 (having therein a tube for receiving gas), a unit 81, and connectors 82, 83 (having therein cold water passage for receiving cold water) of a unit 84.

Connectors 57 and 75, 58 and 76, 60 and 78, 62 and 80, 64 and 82, and 65 and 83 are respectively connected to each other.

With the arrangement of the tool changer for welding robot according to the second embodiment of the present invention, the substrates 31 and 32 are brought to close to each other so that the guide pins 39, 40 are inserted into the guide pin receivers 47, 48. With the insertion of the guide pins 39, 40, each male portion of each connector is guided to thereby engage in each female connector while the projection 41 is engaged in the concave 33 so that both substrates 31, 32 are completely connected to each other. Hence, two kinds of low voltage currents are supplied from the unit 59 to the unit 77 and high voltage current is supplied from the unit 61 to the unit 79 while gas is supplied from the unit 63 to the unit 81 and two kinds of fluids are supplied from the unit 66 to the unit 84. When there is any alteration of usage at the tool side, for example, two kinds of high voltage currents are intended to be used among electricity, gas, air, water, the units 61 and 79 are removed and replaced with units provided with the connectors for supplying two kinds of high voltage currents while the other remaining units are kept as they are.

According to the second embodiment of the present invention, each unit as the terminal is shaped substantially rectangular or, for example, square or fan shaped. The number of units is four which may be optionally selected.

The guide pins 39, 40 and the guide pin receivers 47, 48 can be employed as the cold water passage or the gas passages as illustrated in FIG. 1. Furthermore, the coupler 34 and the projection 41 can be replaced with the transformer,, namely, the transformer is disposed at the location of the coupler 34 and the projection 41.

THIRD EMBODIMENT (FIGS. 6 TO 7)

Figure 6:
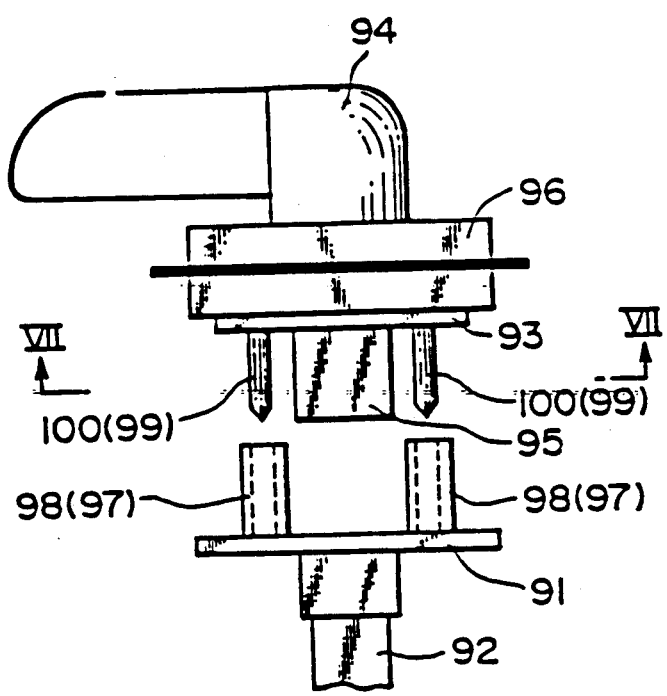
FIG. 6 is a side elevational view of a tool changer for welding robot according to a third embodiment of the present invention.

A tool changer for welding robot according to a third embodiment of the present invention will be described with reference to FIGS. 6 to 7.

The connectors are disposed at both outside (i.e., opposite sides) of the transformer.

In the figure, designated at 91 is a substrate fixed to a robot arm side 92, 93 is a substrate fixed to a welding gun side 94, 95 is a transformer mounted on the substrate 93 between guide pins 99, 100.

An equalizer 96 is disposed between the substrate 93 on which the transformer is mounted and the welding gun 94. Provided on the substrate 91 are connectors 97, 97 for connecting the robot arm 92 and the welding gun side 94. Also provided on the substrate 93 are connectors 99, 99 . . . and the guide pins 100, 100 . . . for the same purpose.

Figure 7:
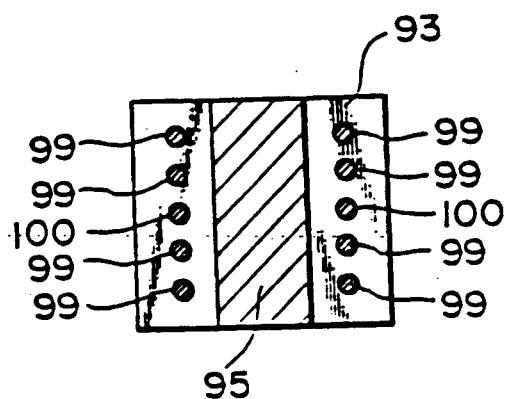
FIG. 7 is a cross sectinal view taken along VII—VII of FIG. 6.
Figure 8:
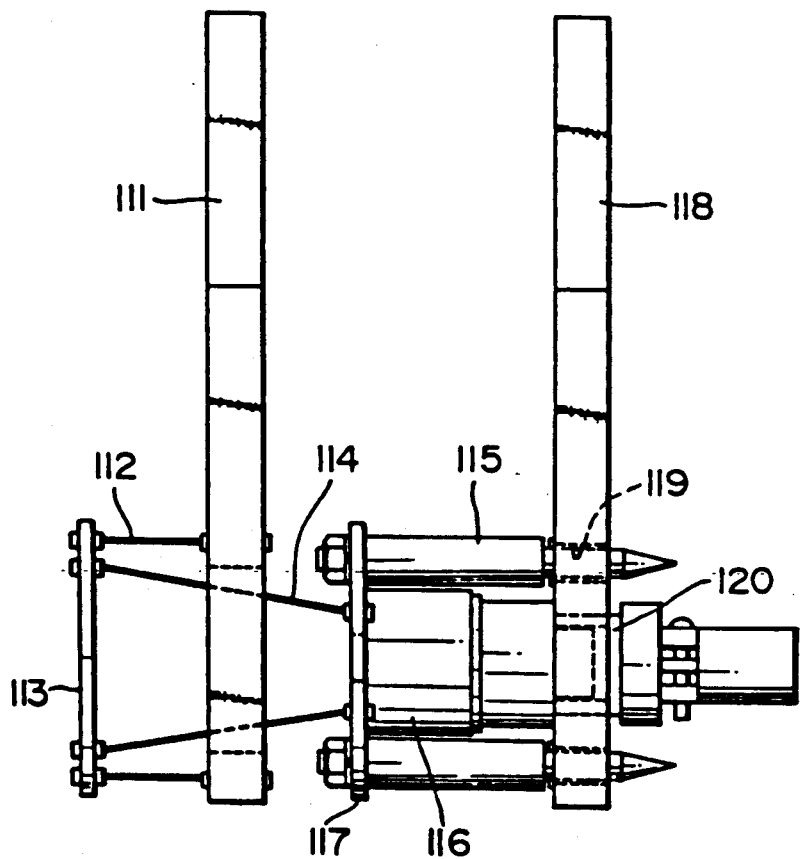
FIG. 8 is a view of assistance in explaining a prior tool changer for welding robot.
Figure 9:
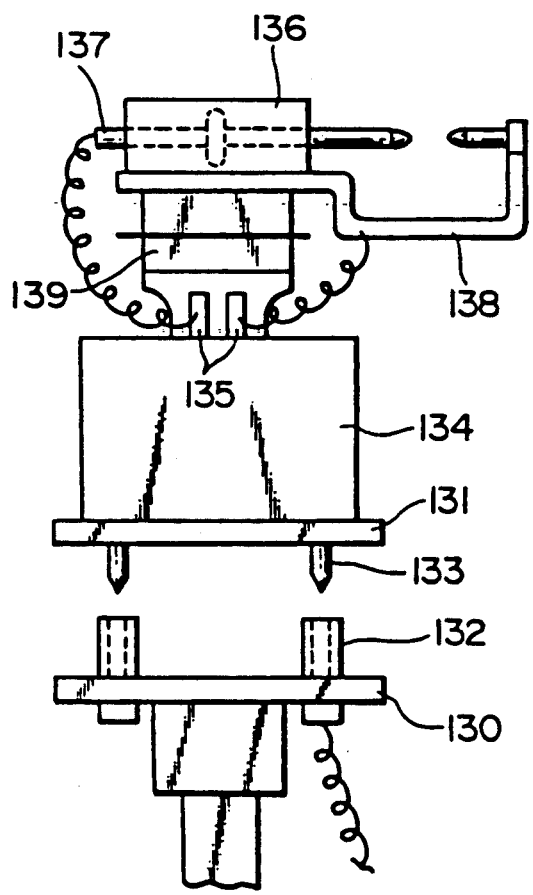
FIG. 9 is a view of assistance in explaining another prior tool changer for welding gun robot.

As shown in FIG. 7 the transformer 95 is mounted on the substrate 93 while the connectors 99, 99 . . . and the guide pins 100, 100 . . . are disposed at the outsides of the transformer 95. The connectors 97, 97 . . . and the guide pin recievers 98, 98 are respectively mounted on the substrate 91 and disposed at the portion corresponding to the portion where the connectors 99, 99 . . . and the guide pins 100, 100 . . . are provided while the central portion of the substrate 91 has a space in which the transformer 95 is inserted.

With such an arrangement of the tool changer for welding robot according to the third embodiment, the substrate 93 is brought close to the substrate 91 so that the guide pins 100 provided on the substrate 93 are inserted in the guide pins receivers 98 provided on the substrate 91 whereby each connector 97, 99 provided respectively on each substrate is guided by the guide pin 100 and are connected to each other to thereby allow electricity, gas, air, cold water, etc. to be supplied from the robot arm side 92 to the welding gun side 94.

Inasmuch as the connectors provided on the substrate 93 are disposed at the outsides of the transformer 95, the connectors 99 are connected to the connectors 97 provided at the substrate 91, the tool changer and the transformer 95 are disposed in parallel to reduce the size thereof.

Using the arrangement of the tool changer for the welding robot according to the third embodiment, the substrate fixed to the welding gun ,side is employed as the one on which the transformer is is the substrate disposed at the robot arm side can be employed as the one on which the transformer is mounted. Also the guide pins are provided on the substrate fixed to the welding gun side but they can be provided on the substrate fixed to the robot arm side.

Furthermore, each connector 99, 99 can be unitized in the plural number in the same manner as illustrated in FIGS. 2, 4 while the guide pins 100 and the guide pin receivers 98 can serve as cold water passages or gas passages as illustrated in FIG. 1. According to the tool changer for the welding robot for the third embodiment, one or more pairs of connectors are serving as both the connectors and a guide mechanism comprising each guide pin and guide pin receiver to thereby omit the guide pin and the guide receiver separately provided from the connectors, which simplifies the construction.

Still furthermore, ,if the connectors are unitized in plural numbers and the units are detachably mounted on each substrate, the unitized connectors coping with the purpose at the tool side can be replaced with other connectors with ease, resulting in high efficiency operation and low cost installaton.

Moreover, if the transformer is fixed to the substrate at the robot arm side, the transformer can be widely utilized for various purposes, which results in omitting each change of the transformer mounted on the substrate at the welding gun side. At this state, if the connectors are disposed at both outsides of the transformer the connectors and the transformer are disposed in parallel to thereby allow the whole construction thereof to be reduced while the center of gravity is lowered whereby the robot can be operated with ease.

What is claimed is:

1. A tool changer for a welding robot, comprising: a first base plate associated with a robot arm and a second base plate associated with a tool member, a plurality of first connector parts supported on said first base plate, said first connector parts being adapted to supply at least one of fluid and electricity to the tool member from the robot arm, a plurality of second connector parts supported on said second base plate, said second connector parts being adapted to receive at least one of fluid and electricity from said first connector parts, each said first connector part being adapted to mate with and form a connection with a respective said second connector part, said connector parts being arranged such that respective pairs of said connector parts mate when said base plates are disposed in a predetermined relationship adjacent one another, each said base plate having a substantially cylindrical coupler element extending therefrom and a yoke fixedly attached thereto, each said yoke having a central opening therethrough and a plurality of fixing elements extending radially outwardly from said central opening, said cylindrical coupler elements being respectively received in said central openings of said yokes, at least some of said first connector parts being carried in groups on plate-like first connector units which are detachably mounted on respective said fixing elements associated with said first base plate, and at least some of said second connector parts being carried in groups on platelike second connector units which are detachably mounted on respective said fixing elements associated with said second base plate.

2. The apparatus according to claim 1, wherein one of said base plates includes a tapered projection extending from said coupler element thereof, the other said base plate having means defining an inwardly tapering opening in said coupler element thereof, said projection being receivable in said opening when said base plates are in said predetermined relationship adjacent one another.

3. The apparatus according to claim 1, wherein said connector parts associated with one of said base plates are male, plug-type connector parts, and wherein said connector parts associated with the other of said base plates are female, socket-type connector parts, said male connector parts being received in said female connector parts when said connector parts mate.

4. The apparatus according to claim 3, wherein said first connector parts are male, plug-type connector parts, and wherein said second connector parts are female, socket-type connector parts.

5. The apparatus according to claim 3, wherein said first connector parts are female, socket-type connector parts, and wherein said second connector parts are male, plug-type connector parts.

* * * * *

UNITED STATES PATENT AND TRADEMARK OFFICE
CERTIFICATE OF CORRECTION

PATENT NO. : 5 010 228
DATED : April 23, 1991
INVENTOR(S) : Toshihiro Nishiwaki

It is certified that error appears in the above-identified patent and that said Letters Patent is hereby corrected as shown below:

ON TITLE PAGE: Item [30]
"Foreign Application Priority Date";
change "63-26705" to ---63-267051---.

Signed and Sealed this

Ninth Day of February, 1993

Attest:

STEPHEN G. KUNIN

Attesting Officer

Acting Commissioner of Patents and Trademarks